United States Patent
Sakamoto (10) Patent No.: US 12,306,569 B2
(45) Date of Patent: May 20, 2025

(54) DRIVE TRANSMITTER, DRIVE DEVICE, AND IMAGE FORMING APPARATUS

(71) Applicant: Shogo Sakamoto, Kanagawa (JP)

(72) Inventor: Shogo Sakamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/388,858

(22) Filed: Nov. 13, 2023

(65) Prior Publication Data

US 2024/0176276 A1  May 30, 2024

(30) Foreign Application Priority Data

Nov. 30, 2022 (JP) ................................ 2022-191678

(51) Int. Cl.
| | | |
|---|---|---|
| *G03G 15/00* | (2006.01) | |
| *F16D 27/00* | (2006.01) | |
| *F16D 27/14* | (2006.01) | |
| *G03G 21/00* | (2006.01) | |
| *G03G 21/16* | (2006.01) | |

(52) U.S. Cl.
CPC ........... *G03G 15/757* (2013.01); *F16D 27/00* (2013.01); *F16D 27/14* (2013.01); *G03G 21/1647* (2013.01)

(58) Field of Classification Search
CPC .. G03G 15/757; G03G 21/1647; F16D 27/00; F16D 27/14; F16D 28/00; F16D 2027/001; F16D 2027/002; F16D 2500/1022; H02K 7/10; H02K 7/114; H02K 49/00

USPC .......................................................... 399/167
See application file for complete search history.

(56) References Cited

U.S. PATENT DOCUMENTS

| | | | |
|---|---|---|---|
| 2009/0126185 A1* | 5/2009 | Chung | H01R 13/405 29/605 |
| 2009/0309681 A1* | 12/2009 | Oh | H01R 4/64 335/299 |
| 2011/0148562 A1* | 6/2011 | Oh | F16D 27/10 29/606 |
| 2018/0039221 A1 | 2/2018 | Nakamoto et al. | |
| 2020/0233364 A1* | 7/2020 | Shimizu | G03G 21/1857 |
| 2020/0387105 A1* | 12/2020 | Mizuno | F16D 27/14 |
| 2022/0299936 A1 | 9/2022 | Sakamoto | |
| 2023/0236541 A1* | 7/2023 | Tomita | G03G 21/186 399/167 |

FOREIGN PATENT DOCUMENTS

| | | | | |
|---|---|---|---|---|
| EP | 2455225 A1 * | 5/2012 | ............. | B41J 13/00 |
| JP | 2009-069596 A | 4/2009 | | |
| JP | 2011202795 A * | 10/2011 | | |
| JP | 2022-142651 A | 9/2022 | | |

\* cited by examiner

*Primary Examiner* — Robert B Beatty
(74) *Attorney, Agent, or Firm* — XSENSUS LLP (57) ABSTRACT

A drive transmitter includes a connector, an electromagnetic clutch, a shaft, and a restriction member. The electromagnetic clutch includes the connector as a single unit. The shaft serves as a rotation axis of the electromagnetic clutch. The restriction member restricts a position of the connector in an axial direction of the shaft.

13 Claims, 9 Drawing Sheets

DRIVE TRANSMITTER, DRIVE DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-191678, filed on Nov. 30, 2022, in the Japan Patent Office, the entire disclosure of which is hereby incorporated by reference herein.

BACKGROUND

Technical Field

Embodiments of the present disclosure relate to a drive transmitter, a drive device incorporating the drive transmitter, and an image forming apparatus incorporating the drive transmitter.

Background Art

Various typical drive transmitters are known that include an electromagnetic clutch integrally provided with a connector. For example, a drive transmitter in the art includes a connector and a cutout portion formed in the housing of the drive transmitter. The connector is engaged with the edge of the cutout portion that exposes the connector to the outside so that the connector functions as a rotation lock.

SUMMARY

Embodiments of the present disclosure described herein provide a novel drive transmitter including a connector, an electromagnetic clutch, a shaft, and a restriction member. The electromagnetic clutch includes the connector as a single unit. The shaft serves as a rotation axis of the electromagnetic clutch. The restriction member restricts a position of the connector in an axial direction of the shaft.

Further, embodiments of the present disclosure described herein provide a drive device including the above-described drive transmitter, and a drive source to generate a power to be transmitted to the above-described drive transmitter.

Further, embodiments of the present disclosure described herein provide an image forming apparatus including the above-described drive device provided with the above-described drive transmitter, and an image forming unit driven by the drive device.

BRIEF DESCRIPTION OF THE SEVERAL VIEWS OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. As used herein, the singular forms "a," "an," and "the" are intended to include the plural forms as well, unless the context clearly indicates otherwise.

Now, a description is given of an electrophotographic printer that functions as an electrophotographic image forming apparatus for forming images by electrophotography, according to the present disclosure. The electrophotographic printer is simply referred to as a printer. The image forming apparatus according to an embodiment of the present disclosure is described as an electrophotographic image forming apparatus. However, no limitation is intended thereby, and the image forming apparatus according to an embodiment of the present disclosure may be applied to, for example, an inkjet image forming apparatus employing an inkjet method or an image forming apparatus employing a mimeo graphic printing method.

Figure 1:
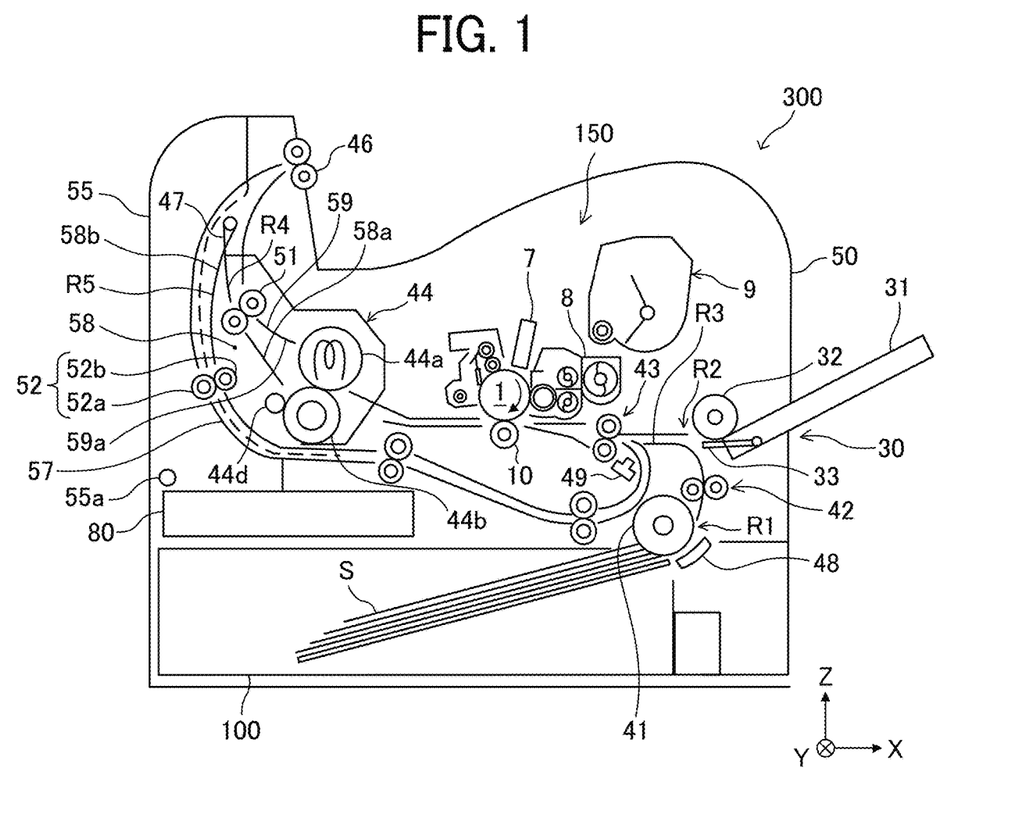
FIG. 1 is a diagram illustrating a schematic configuration of a printer serving as an image forming apparatus according to an embodiment of the present disclosure.

At first, a description is given of a basic configuration of a printer 300 according to an embodiment of the present disclosure, with reference to FIG. 1.

FIG. 1 is a schematic diagram illustrating the printer 300 according to the present embodiment.

The directions of X, Y, and Z in the drawings are as follows, and the same applies to other drawings. The printer 300 illustrated in FIG. 1 is a view from the front. In this case, the direction X is parallel to the left and right sides of the printer 300 and is directed from left to right. The direction Y is parallel to the front and rear sides of the printer 300 and is directed from the front side to the rear side of the printer 300. The direction Z is a vertical direction from bottom to top.

In FIG. 1, the printer 300 according to the present embodiment includes a housing 50, an image forming unit 150 including a photoconductor 1 and image forming components around the photoconductor 1, and a sheet tray 100. The image forming unit 150 forms an image on a sheet. The photoconductor 1 functions as an image bearer or a latent image bearer. The sheet tray 100 functions as a sheet container that is detachably attachable to the housing 50. The sheet tray 100 contains multiple recording sheets S in the form of a sheet bundle that includes a recording sheet S.

As a sheet feed roller 41 is driven to rotate, the recording sheet S stacked on the sheet tray 100 is fed from the sheet tray 100. When the multiple recording sheets S are fed from the sheet tray 100, an uppermost recording sheet S alone is separated from the other recording sheets S in a sheet separation nip region formed between the sheet feed roller 41 and a sheet separation pad 48, and is continuously conveyed toward downstream in a sheet conveyance direction in which the recording sheet S is conveyed. Then, the recording sheet S (i.e., the uppermost recording sheet S) reaches a regular sheet conveyance passage R1 that functions as a first sheet conveyance passage.

Then, the recording sheet S is gripped (nipped) in a sheet conveyance nip region formed by a relay roller pair 42 that functions as an upper conveyance roller pair, so that the recording sheet S is conveyed from upstream toward downstream in the sheet conveyance direction in the regular sheet conveyance passage R1. The conveyance roller pair may include a conveyance belt. In other words, the conveyance roller pair may include at least one conveyance belt as a member of a pair of sheet conveyance members.

The downstream end of the regular sheet conveyance passage R1 communicates with a common sheet conveyance passage R3. A registration roller pair 43 is provided in the common sheet conveyance passage R3. A registration sensor 49 that detects the recording sheet S is provided in the common sheet conveyance passage R3 and is disposed upstream from the registration roller pair 43 in the sheet conveyance direction. When the recording sheet S reaches the registration roller pair 43, the recording sheet S is stopped temporality with the leading end of the recording sheet S being in contact with the registration nip region of the registration roller pair 43 that is stopped. While the leading end of the recording sheet S contacts the registration roller pair 43, skew of the recording sheet S is corrected. The registration sensor 49 is also used for an initial operation and a confirmation operation to check whether there is a remaining recording sheet S when cancelling an abnormal stop of the printer 300.

The registration roller pair 43 starts rotating in synchrony with conveyance of the recording sheet S at a timing at which the recording sheet S contacts the surface of the photoconductor 1 to receive a toner image on the surface of the photoconductor 1 in the sheet transfer nip region. Then, the recording sheet S is conveyed toward the sheet transfer nip region. At this time, the relay roller pair 42 starts rotating simultaneously with the start of rotations of the relay roller pair 42, so as to start conveyance of the recording sheet S that has been temporarily stopped.

The printer 300 according to the present embodiment includes a bypass sheet feeder in the housing 50. The bypass sheet feeder 30 serving as a bypass feeder includes a bypass sheet tray 31, a bypass sheet feed roller 32, and a sheet separation pad 33. The recording sheet S placed on the bypass sheet tray 31 of the bypass sheet feeder 30 is fed from the bypass sheet tray 31 along with rotation of the bypass sheet feed roller 32 that functions as a sheet feed roller to feed the recording sheet S, to a bypass sheet conveyance passage R2 that functions as a second sheet conveyance passage. The downstream end of the bypass sheet conveyance passage R2 and the downstream end of the regular sheet conveyance passage R1 meet with a common sheet conveyance passage R3. The recording sheet S fed out by the bypass sheet feed roller 32 passes the sheet separation nip region formed by contact of the bypass sheet feed roller 32 and the sheet separation pad 33 in the bypass sheet conveyance passage R2. Then, the recording sheet S is conveyed to the common sheet conveyance passage R3 to be conveyed to the registration roller pair 43. Similar to the recording sheet S fed from the sheet tray 100, the recording sheet S fed from the bypass sheet tray 31 passes the registration roller pair 43 to be conveyed to the transfer nip region.

Figure 2:
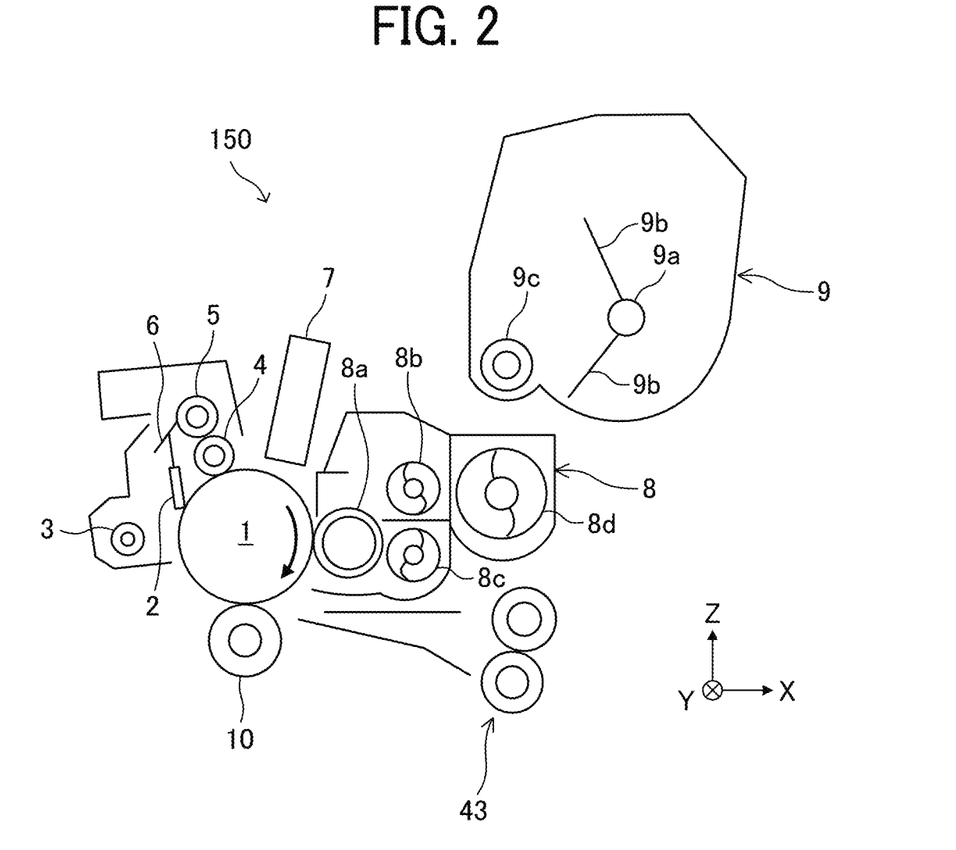
FIG. 2 is an enlarged view of an image forming unit included in the printer according to an embodiment of the present disclosure, illustrating a schematic configuration of the image forming unit including a photoconductor and image forming components around the photoconductor.

FIG. 2 is an enlarged view of the image forming unit 150 included in the printer 300 according to an embodiment of the present disclosure and illustrates a schematic configuration of the image forming unit 150 including the photoconductor 1 and image forming components around the photoconductor 1.

To be more specific, a cleaning blade 2, a toner collection screw 3, a charging roller 4, a charging roller cleaning roller 5, a scraper 6, a latent image writing device 7, a developing device 8, and a transfer roller 10 are provided as the image forming units around the drum-shaped photoconductor 1 that is rotated in a clockwise direction in FIG. 2.

The photoconductor 1 and the image forming units integrally function as an image forming device.

The charging roller 4 includes a conductive rubber roller and forms a charging nip region by rotating while contacting the photoconductor 1. The charging roller 4 is applied with a charging bias that is output from a power source for the charging roller 4. As a result, the surface of the photoconductor 1 is uniformly charged by the charging bias generated between the surface of the photoconductor 1 and the surface of the charging roller 4 in the charging nip region.

The latent image writing device 7 includes a light-emitting diode (LED) array and performs light scanning with LED light over the surface of the photoconductor 1 that has been uniformly charged. As the latent image writing device 7 emits laser light beams onto the uniformly charged surface of the photoconductor 1, the electric potential of the irradiated (exposed) region of the charged surface of the photoconductor 1 attenuate, so that an electrostatic latent image is formed on the surface of the photoconductor 1.

As the photoconductor 1 rotates, the electrostatic latent image passes through a development region that formed between the surface of the photoconductor 1 and the developing device 8 when the photoconductor 1 is rotated and brought to face the developing device 8. The developing device 8 includes a developer circulation conveyance portion and a developing portion. The developer circulation conveyance portion includes developer that contains non-magnetic toner and magnetic carriers. The developer circulation conveyance portion includes a first screw 8*b* for conveying the developer to be supplied to a developing roller 8*a*, a second screw 8*c* for conveying the developer in an independent space positioned beneath the first screw 8*b*. The developer circulation conveyance portion further includes an inclined screw 8*d* for receiving the developer from the second screw 8*c* and supplying the developer to the first screw 8*b*. The developing roller 8*a*, the first screw 8*b*, and the second screw 8*c* are placed at postures parallel with each other. By contrast, the inclined screw 8*d* is placed at a posture inclined with respect to the developing roller 8*a*, the first screw 8*b*, and the second screw 8*c*.

As the first screw 8*b* rotates, the first screw 8*b* conveys the developer from a far side toward a near side in a direction perpendicular to the drawing sheet of FIG. 2. At this time, the first screw 8*b* supplies a portion of the developer to the developing roller 8*a* that is disposed facing the first screw 8*b*. The developer having been conveyed by the first screw 8*b* to the vicinity of the near end portion of the first screw 8*b* in the direction perpendicular to the drawing sheet of FIG. 2 is dropped onto the second screw 8*c*.

While receiving the used developer from the developing roller 8*a*, the second screw 8*c* conveys the received developer from the far side toward the near side in the direction perpendicular to the drawing sheet of FIG. 2, along with rotation of the second screw 8*c*. The developer conveyed by the second screw 8*c* to the vicinity of the near end portion of the second screw 8*c* in the direction perpendicular to the drawing sheet of FIG. 2 is supplied to the inclined screw 8*d*. Further, along with rotation of the inclined screw 8*d*, the developer is conveyed from the near side toward the far side in the direction perpendicular to the drawing sheet of FIG. 2. Then, the developer is supplied to the first screw 8*b* in the vicinity of the far end portion of the first screw 8*b* in the direction perpendicular to the drawing sheet of FIG. 2.

The developing roller 8*a* includes a developing sleeve and a magnet roller. The developing sleeve is a tubular-shaped rotatable non-magnetic member. The magnet roller is fixed to the developing sleeve in such a way as not to rotate together with the developing sleeve. Part of the developer that is conveyed by the first screw 8*b* is scooped up by the surface of the developing sleeve due to magnetic force generated by the magnet roller. The developer, which is carried onto the surface of the developing sleeve, is conveyed along with rotation of the developing sleeve, and passes through an opposing position at which the developing sleeve and a doctor blade are disposed facing each other. According to this configuration, the thickness of a layer of the developer on the surface of the developing sleeve is regulated while the developer is rotated together with rotation of the surface of the development sleeve. Then, the developing roller 8*a* moves (rotates) while sliding on the surface of the photoconductor 1 in a development region in which the developing roller 8*a* is brought to face the photoconductor 1.

A development bias having the same polarity as the toner and as a uniformly charged electric potential (i.e., a background electric potential) on the surface of the photoconductor 1 is applied to the developing sleeve. The absolute value of this development bias is greater than the absolute value of the electric potential of the latent image and is smaller than the absolute value of the background electric potential on the background surface of the photoconductor 1. For this reason, in the development region, a development potential acts between the electrostatic latent image formed on the photoconductor 1 and the developing sleeve of the developing device 8, so as to electrostatically move the toner from the developing sleeve toward the electrostatic latent image on the surface of the photoconductor 1. By contrast, a background potential acts between the background surface of the photoconductor 1 and the development sleeve of the developing device 8, so as to electrostatically move the toner from the photoconductor 1 to the developing sleeve. This action of the background potential causes the toner to selectively adhere to the electrostatic latent image formed on the surface of the photoconductor 1, so that the electrostatic latent image is developed in the development region.

The developer that has passed through the development region enters an opposing region in which the developing sleeve faces the second screw 8*c* as the developing sleeve rotates. In the opposing region, a repulsive magnetic field is formed by two magnetic poles having polarities different from each other out of multiple magnetic poles included in the magnet roller.

The developer that has entered the opposing region is separated from the surface of the developing sleeve due to the effect of the repulsive magnetic field and is collected by the second screw 8*c*.

The developer that is conveyed by the inclined screw 8*d* contains the developer that has been collected from the developing roller 8*a*, and this collected developer is contributed to development in the development region, so that the toner concentration is lowered. The developing device 8 includes a toner concentration sensor that detects the toner concentration of the developer to be conveyed by the inclined screw 8*d*. Based on detection results obtained by the toner concentration sensor, a controller 80 outputs a replenishment operation signal for replenishing the toner to the developer that is conveyed by the inclined screw 8*d*, accordingly, the controller 80 functions as circuitry that includes semiconductor circuits such as a central processing unit (CPU).

A toner cartridge 9 is disposed above the developing device 8. The toner cartridge 9 contains toner and agitates the toner with agitators 9*b* fixed to a rotary shaft 9*a*. Further, a toner supply member 9*c* is driven to rotate in accordance with the replenishment operation signal output from the controller 80. With this operation, an amount of toner corresponding to an amount of rotations of the toner supply member 9c is replenished to the inclined screw 8d of the developing device 8.

The toner image formed on the surface of the photoconductor 1 as a result of the development by the developing device 8 enters the transfer nip region where the photoconductor 1 and the transfer roller 10 contact each other along with rotation of the photoconductor 1. An electric bias having the opposite polarity to the latent image electric potential of the photoconductor 1 is applied to the transfer roller 10. Accordingly, a transfer bias is formed within the transfer nip region.

As described above, the registration roller pair 43 conveys the recording sheet S toward the transfer nip region in synchrony with a timing at which the toner image formed on the photoconductor 1 is overlaid onto the sheet S in the transfer nip region. Due to the transfer bias and the nip pressure, as the recording sheet S is brought to closely contact with the toner image formed on the photoconductor 1 at the transfer nip region, the toner image is transferred onto the recording sheet S.

Residual toner that has not been transferred onto the recording sheet S remains on the surface of the photoconductor 1 after having passed through the transfer nip region. After being scraped off from the surface of the photoconductor 1 by the cleaning blade 2 that is in contact with the photoconductor 1, the residual toner is conveyed by the toner collection screw 3, toward a waste toner bottle.

The surface of the photoconductor 1 that is cleaned by the cleaning blade 2 is electrically discharged by an electric discharging device. Then, the surface of the photoconductor 1 is uniformly charged again by the charging roller 4. Foreign materials such as toner additive agents and the toner that has not been removed by the cleaning blade 2 remain on the charging roller 4 that is in contact with the surface of the photoconductor 1. These foreign materials are transferred to the charging roller cleaning roller 5 that is in contact with the charging roller 4, and then are scraped off from the surface of the charging roller cleaning roller 5 by the scraper 6 that is in contact with the charging roller cleaning roller 5. The foreign materials scraped off from the surface of the charging roller cleaning roller 5 falls onto the toner collection screw 3.

In FIG. 1, the recording sheet S, which has passed through the transfer nip region formed by the photoconductor 1 and the transfer roller 10 contacting each other, is conveyed to a fixing device 44. The fixing device 44 includes a fixing roller 44a and a pressure roller 44b. The fixing roller 44a includes a heat generating source 44c such as a halogen lamp. The pressure roller 44b is pressed against the fixing roller 44a. The fixing roller 44a and the pressure roller 44b contact each other to form a fixing nip region. The toner image is fixed to the surface of the recording sheet S that is held in the fixing nip region due to application of heat and pressure. Then, the recording sheet S that has passed through the fixing device 44 passes through a sheet ejection passage R4. Then, the recording sheet S is nipped in a sheet ejection nip region formed by a sheet ejection roller pair 46.

The printer 300 can switch printing modes between a single-side printing mode for performing single-side printing and a duplex printing mode for performing duplex printing. In the single-side printing mode, the printer 300 produces an image on one side of the recording sheet S. By contrast, the printer 300 prints respective images on both sides of the recording sheet S in the duplex printing mode.

In the single-side printing mode or in the duplex printing mode in which images are formed on both sides of the recording sheet S, the sheet ejection roller pair 46 continues rotating in a forward direction and a reverse direction alternately, so that the recording sheet S in the sheet ejection passage R4 is ejected out of the printer 300. After passing through the fixing device 44, the recording sheet S is stacked on a sheet stacker provided on the top face of the housing 50 of the printer 300.

By contrast, in the duplex printing mode when an image is formed on one side of the recording sheet S, the sheet ejection roller pair 46 is rotated in the reverse direction at the timing at which the trailing end of the recording sheet S enters the sheet ejection nip region of the sheet ejection roller pair 46. At this time, a switching claw 47 (switching member) disposed near the downstream end of the sheet ejection passage R4 moves to block (close) the sheet ejection passage R4 and open an entrance of a reverse sheet conveyance passage R5 at the same time. As the recording sheet S starts reversing by the reverse rotation of the sheet ejection roller pair 46, the recording sheet S is conveyed to the reverse sheet conveyance passage R5. The downstream end of the reverse sheet conveyance passage R5 meets the common sheet conveyance passage R3 on the upstream side from the registration roller pair 43 in the sheet conveyance direction. After being conveyed in the reverse sheet conveyance passage R5, the recording sheet S is conveyed to the registration roller pair 43 in the common sheet conveyance passage R3 again. Then, after a toner image has been formed on the other side of the recording sheet S in the transfer nip region, the recording sheet S passes through the fixing device 44, the sheet ejection passage R4, and the sheet ejection roller pair 46 and is then ejected to the outside of the housing 50 of the printer 300.

The fixing device 44 further includes a cleaning roller 44d. The cleaning roller 44d functions as a contact-separation member to remove adhered substances or foreign materials (such as toner and paper dust) adhered to the surface of the pressure roller 44b that functions as a contact-separation target member. In other words, the cleaning roller 44d contacts the pressure roller 44b or separates from the pressure roller 44b, by a contact-separation mechanism. The details of the contact-separation mechanism are described below.

Further, the fixing device 44 also includes a member including a portion from the fixing nip region of the sheet ejection passage R4 to the switching claw 47. Specifically, the fixing device 44 includes a sheet ejection guide 59, a sheet ejection reversal guide 58, and a relay conveyance roller pair 51. The sheet ejection guide 59 is disposed facing a contact face of the recording sheet S to which the recording sheet S after passing through the fixing nip region contacts the fixing roller 44a. The sheet ejection guide 59 includes a guide portion 59a to guide the recording sheet S to the switching claw 47. The sheet ejection reversal guide 58 includes a sheet ejection guide portion 58a and a sheet reversal guide portion 58b. The sheet ejection guide portion 58a is disposed facing a contact face of the recording sheet S to which the recording sheet S after passing through the fixing nip region contacts the pressure roller 44b. The sheet ejection guide portion 58a guides the recording sheet S to the switching claw 47. The sheet reversal guide portion 58b is disposed facing an image forming face of the recording sheet S after passing through the switching claw 47 in the reverse sheet conveyance passage R5 to guide the recording sheet S. Further, a driven roller 52b of a sheet reversal conveyance roller pair 52 is also attached to the sheet ejection reversal guide 58 to convey the recording sheet S in the reverse sheet conveyance passage R5.

Further, the housing 50 of the printer 300 includes a cover unit 55 on a left side face of the housing 50 of the printer 300 in FIG. 1. The cover unit 55 opens and closes around a shaft 55a. The cover unit 55 includes a sheet reversal guide 57 that is disposed facing a non-image forming surface of the recording sheet S in the reverse sheet conveyance passage R5 to guide the recording sheet S. A drive roller 52a of the sheet reversal conveyance roller pair 52 is attached to the sheet reversal guide 57.

A description is now given of a drive device according to the present embodiment.

Figure 3:
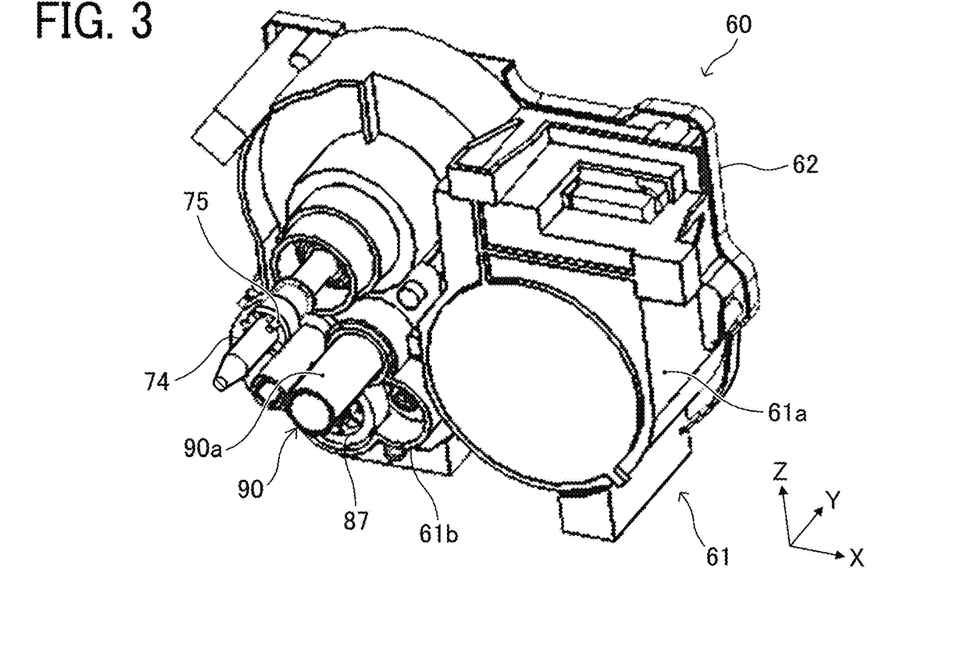
FIG. 3 is a schematic perspective view of a drive device according to an embodiment of the present disclosure.

FIG. 3 is a schematic perspective view of a drive device 60 that drives an image forming unit, according to the present embodiment.

The drive device 60 transmits a driving force of a drive motor to the image forming unit 150, to be more specific, to a photoconductor 1, a developing device 8, a registration roller pair 43, and the sheet feed roller 41. The drive device 60 includes a resin housing 61 and a metal mounting plate 62. The resin housing 61 is made of a flame retardance resin. The resin housing 61 includes a motor housing portion 61a and a gear housing portion 61b. The motor housing portion 61a covers the drive motor 63 (see FIG. 4). The gear housing portion 61b covers the gear.

A photoconductor drive shaft 74 whose leading end is inserted into the photoconductor 1 and a coupling portion 90a of the development drive transmitting member 90 penetrate from the gear housing portion 61b. A photoconductor coupling 75 is mounted on the photoconductor drive shaft 74. The photoconductor coupling 75 is engaged with the flange of the photoconductor 1 to transmit the driving force to the photoconductor 1. A registration output gear 87 illustrated in FIG. 3 outputs the driving force of the drive motor to the registration roller pair 43.

Figure 4:
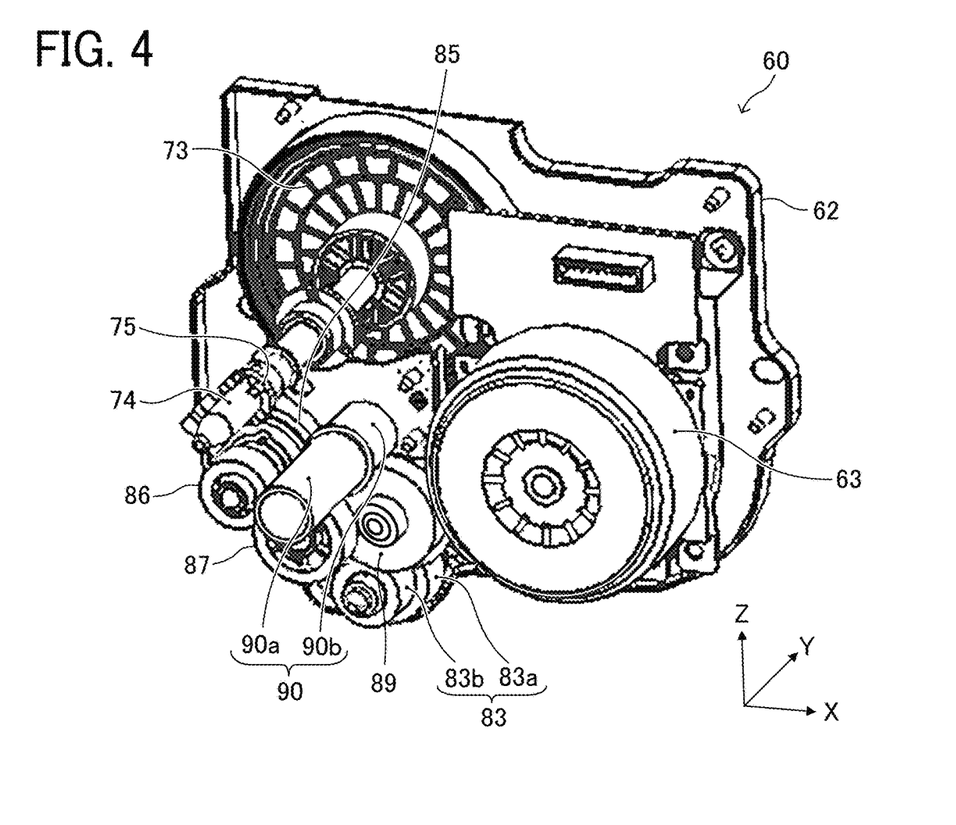
FIG. 4 is a schematic perspective view of the drive device from which a resin housing is removed, according to an embodiment of the present disclosure.

FIG. 4 is a schematic perspective view of the drive device 60 from which the resin housing 61 is removed, according to an embodiment of the present disclosure.

Figure 5:
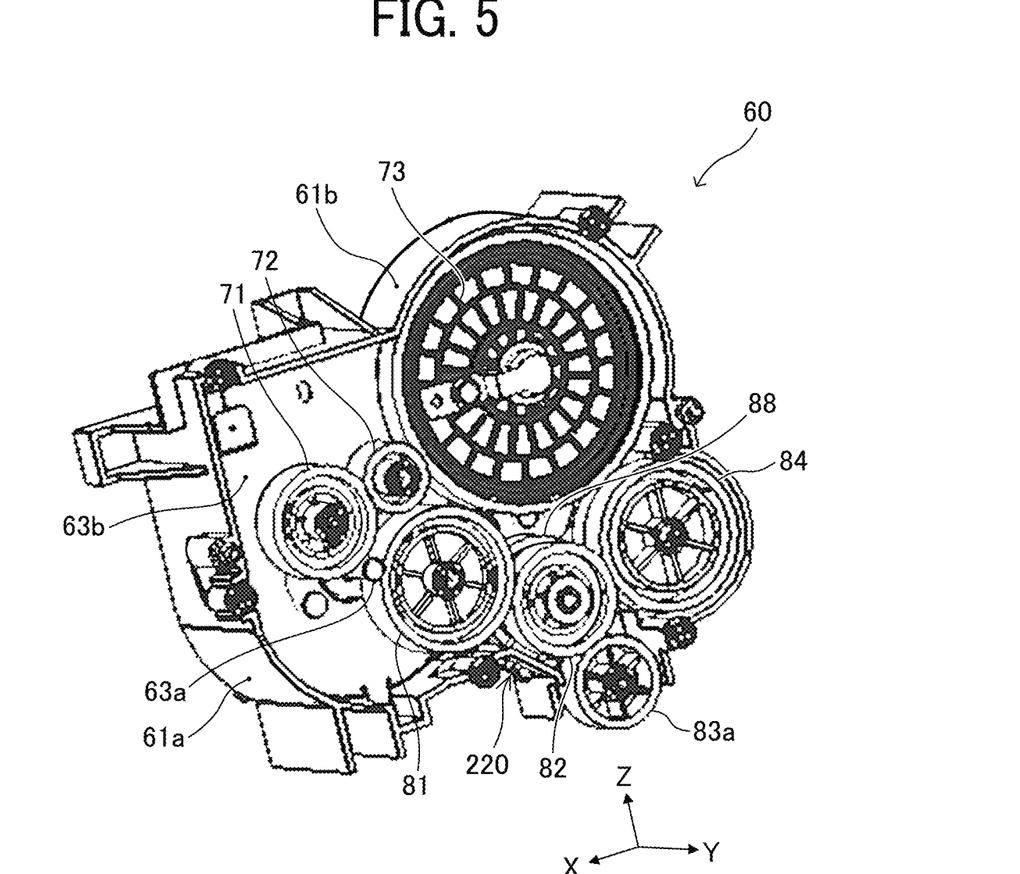
FIG. 5 is a perspective view of a drive device from which a mounting metal plate is removed, as viewed from a side of the mounting metal plate, according to an embodiment of the present disclosure.

FIG. 5 is a perspective view of the drive device 60 from which the metal mounting plate 62 (i.e., a bracket) is removed, as viewed from a side of the metal mounting plate 62, according to an embodiment of the present disclosure.

As illustrated in FIG. 5, a first input gear 71 and a second input gear 81 mesh with a motor gear disposed directly on a motor shaft 63a of the drive motor 63 that serves as an electrical component. An idler gear 72 meshes with the first input gear 71, and a photoconductor gear 73 meshes with the idler gear 72. As illustrated in FIG. 4, the photoconductor gear 73 is attached to the photoconductor drive shaft 74. The first input gear 71, the second input gear 81, and the idler gear 72 are disposed between the metal mounting plate 62 and a motor bracket 63b made of sheet metal.

The second input gear 81 is meshed with a branch gear 82. The branch gear 82 is meshed with a first sheet feed gear 83a of a sheet conveyance gear 83 and a registration first gear 84, respectively. A development electromagnetic clutch 88 as an electrical component and a development first gear 89 (see FIG. 4) are provided coaxially with the branch gear 82. The driving force is then transmitted from the branch gear 82 to the development first gear 89 via the development electromagnetic clutch 88. The development first gear 89 is meshed with a development gear 90b of the development drive transmitting member 90.

The sheet conveyance gear 83 includes the first sheet feed gear 83a and a second sheet feed gear 83b. The second sheet feed gear 83b transmits the driving force of the drive motor 63 to a sheet conveyance drive transmission mechanism (i.e., the sheet feed drive unit 230 in FIG. 9) that transmits the driving force to the sheet feed roller 41.

A registration electromagnetic clutch 85 as an electrical component and a registration second gear 86 (see FIG. 4) are provided coaxially with the registration first gear 84. The registration second gear 86 transmits the driving force from the registration first gear 84 via the registration electromagnetic clutch 85. The registration second gear 86 is meshed with a registration output gear 87 that outputs the driving force of the drive motor to the registration roller pair 43.

A description is now given of thrust regulation of a connector integrally attached to the electromagnetic clutch according to the present embodiment.

In using an electromagnetic clutch, the electromagnetic clutch to which a connector directly attached is common in cost reduction. Further, due to a reduction in weight and cost of the machine, the needs of the size of the machine becomes strict, and the width in the direction of the rotation axis that can be used in the drive system is reduced.

When using the electromagnetic clutch that is not disposed on a roller on which the electromagnetic clutch can be directly disconnected but is connected in the middle of the drive train, the gear and the electromagnetic clutch may be sandwiched between the gears on both sides in the axial direction to be in a sandwiched state or the gears may approach from one side. However, when the mating connector is inserted into or removed from the connector of the electromagnetic clutch, the connector case of the connector integrated with the electromagnetic clutch is likely to be deformed and the connector may be brought into contact with, for example, a drive transmission member such as a gear disposed near the electromagnetic clutch, resulting in damage on the drive transmission member. If the distance between, for example, the gears is increased in order to avoid this inconvenience, it may be difficult to sufficiently obtain the tooth width of the gears to reduce an increase in the width of the drive system in the direction of the rotation axis. Excessive deformation of the connector at the time of insertion and removal may also cause disconnection of an internal pin (i.e., a conductor).

A description is now given of the thrust regulation of the connector of a connector-integrated electromagnetic clutch according to the present embodiment.

Specifically, the development electromagnetic clutch 88 illustrated in FIG. 5 is a connector-integrated electromagnetic clutch to perform thrust regulation of the connector. As illustrated in FIG. 5, thrust regulation is performed by using a rotation lock opening 220 formed in the vicinity of the development electromagnetic clutch 88 on the gear housing portion 61b.

Figure 6:
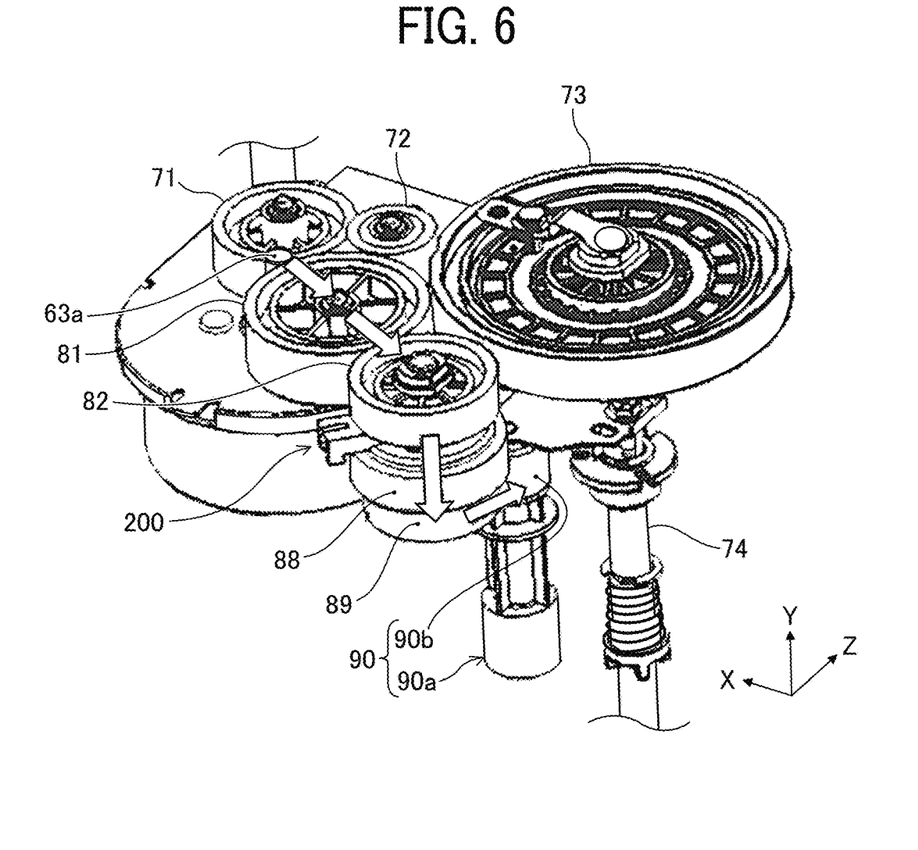
FIG. 6 is a perspective view of a development drive transmission passage.

FIG. 6 is a perspective view of a development drive transmission passage extending from the motor shaft 63a to the coupling portion 90a.

Members defining a transmission passage of the driving force to the photoconductor drive shaft 74 are also illustrated. The development electromagnetic clutch 88 that is provided with the connector 200 as a single unit is sandwiched between the branch gear 82 and the development first gear 89, both of which are disposed coaxial with each other.

The motor shaft 63a transmits the driving force to not only the driving member of the image forming unit but also the driving members of the sheet feeding unit and the waste toner unit. For this reason, the motor shaft 63a continues to rotate while any driving member of any unit is driven. Due to such a configuration, an electromagnetic clutch serving as a connection-disconnection mechanism is provided in the middle of multiple drive transmission members so that the drive transmission members do not need to be rotated constantly, for example, during development, and can be stopped during a period in which the drive transmission members do not need to be rotated due to the service life of the drive transmission members. As a result, a running distance for development is minimized. For the same reason, the registration electromagnetic clutch 85 described above is also provided (see FIG. 4).

Figure 7:
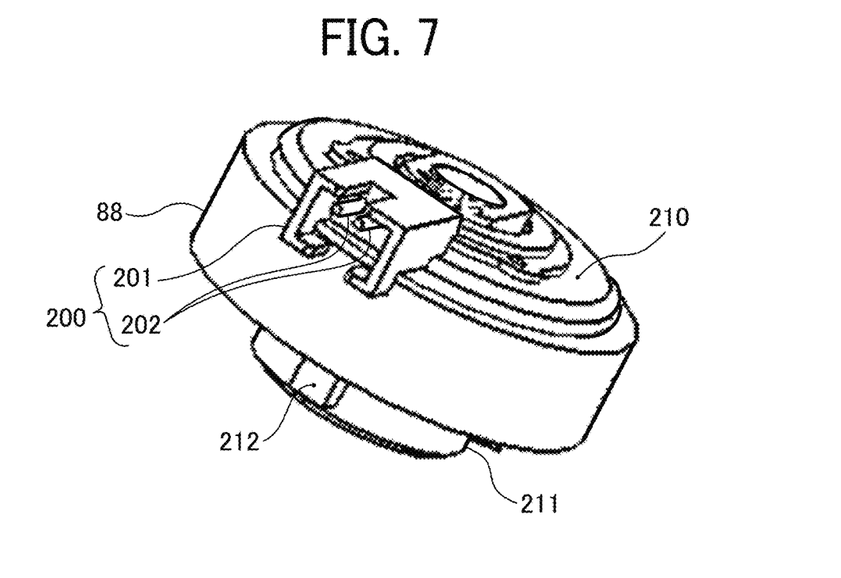
FIG. 7 is a diagram illustrating a connector-integrated electromagnetic clutch.

FIG. 7 is a perspective view of the development electromagnetic clutch 88 to which a connector is directly attached.

Typically, an electromagnetic clutch includes a field housing having an annular container with an opening at one end, an exciting coil formed by winding a coil wire around a spool and accommodated in the container together with the spool, a pin that is a terminal coupled to the spool and electrically connected to an end portion of the coil wire, and a connector case serving as a holder portion for holding the pin.

As illustrated in FIG. 7, the connector 200 accommodating pins 202 in a connector case 201 is integrated with a housing 210 made of a sheet metal of a field by, for example, adhesion.

The connector 200 is also used as a rotation lock for the field. A transmission pin 212 projecting in a radial direction is formed on an output portion 211 of a lower part rotating while an electromagnetic clutch is coupled.

Figure 8:
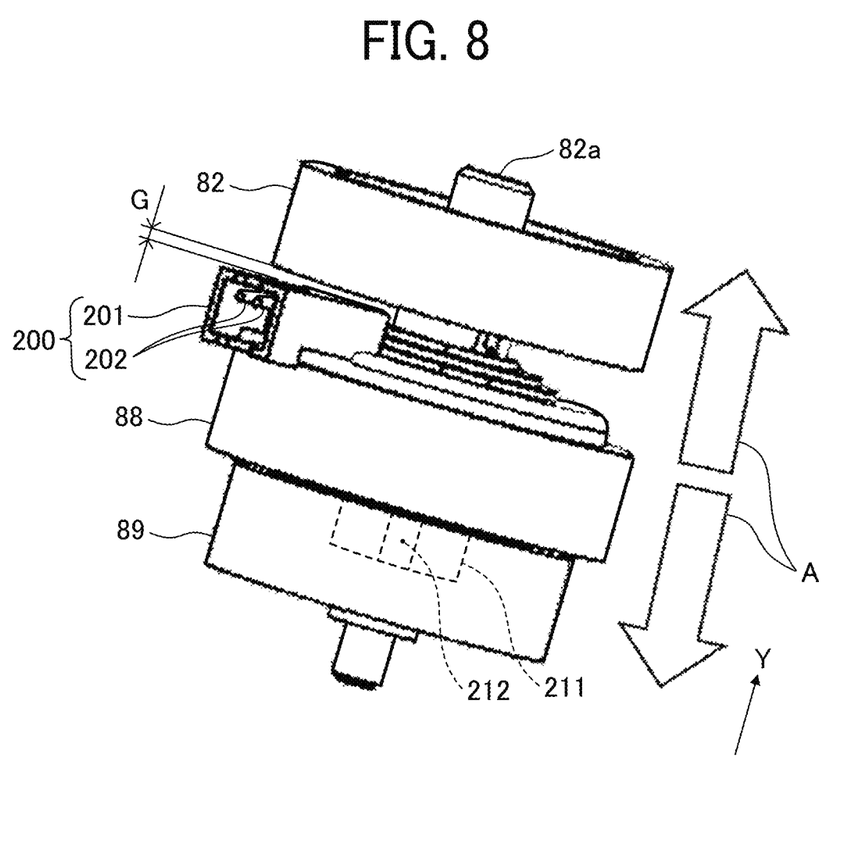
FIG. 8 is a perspective view of a development electromagnetic clutch in a sandwiched state.

FIG. 8 is a perspective view of the development electromagnetic clutch 88 sandwiched by the branch gear 82 and the development first gear 89.

In FIG. 8, the output portion 211 of the development electromagnetic clutch 88 is disposed in a recess formed in the development first gear 89 facing the development electromagnetic clutch 88, as indicated by a hidden line (i.e., a broken line). An engaging portion that engages with the transmission pin 212 of the output portion 211 is formed in the recess.

In the drawing, the white arrow A indicates a thrust direction, which is coaxial with a shaft core 82*a* serving as is a shaft portion.

The development electromagnetic clutch 88 is sandwiched between the gears from both sides, and the connector 200 is close to the teeth of the gears. Due to this configuration, it is difficult to sufficiently obtain the tooth width of the gears in order to avoid contact of the connector 200 with the gears. A gap G (i.e., a clearance) between the branch gear 82 and the connector 200 of the development electromagnetic clutch 88 is relatively narrow, and the connector 200 may be deformed at the time of insertion and removal, which is also a factor of contact of a connector with a gear.

Figure 9:
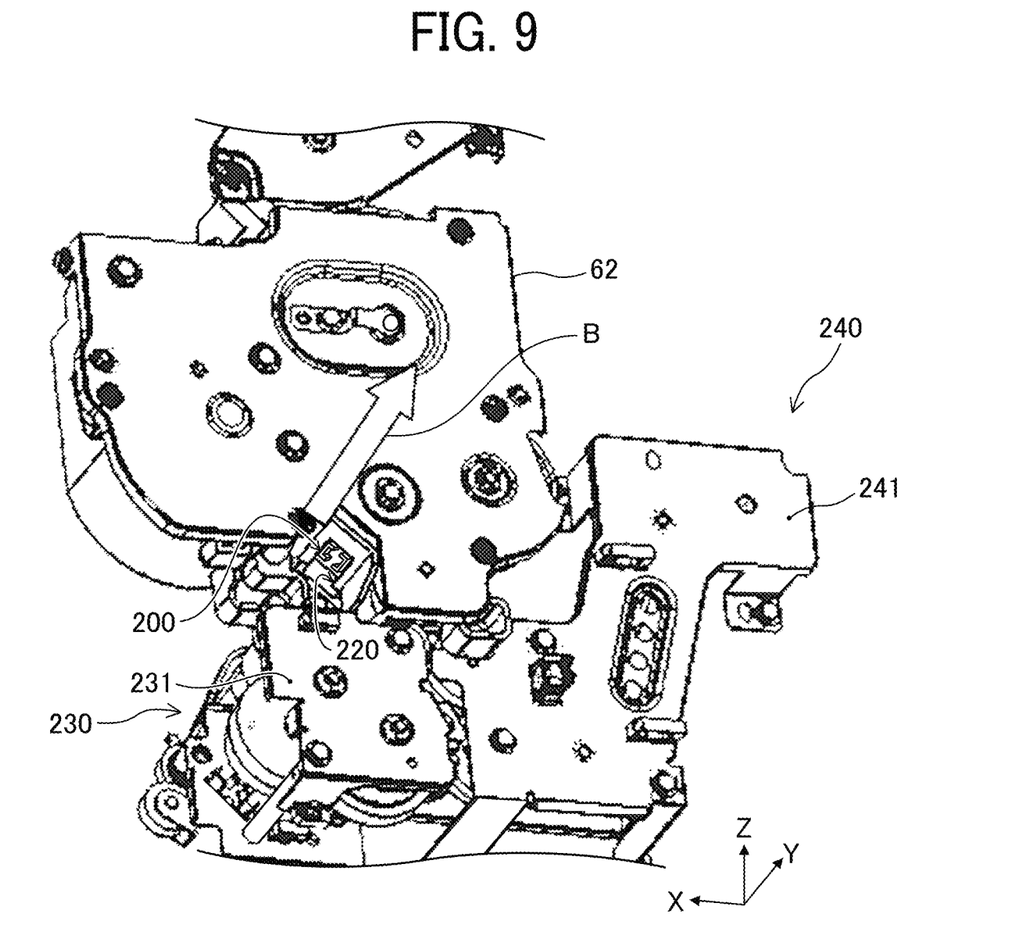
FIG. 9 is a perspective view of the drive device, illustrating an insertion direction of a connector.

FIG. 9 is a perspective view of the drive device 60 from the metal mounting plate 62, indicating an arrow B corresponding to the insertion direction of the connector 200.

The connector 200 partially protrudes from the rotation lock opening 220. When the mating connector is inserted into or removed from the connector 200, it is ideal to remove the mating connector in the horizontal direction. However, there may be a situation where it is difficult to insert or remove separate units as illustrated in the drawing. In this case, the separate units may be inserted or removed in an oblique direction. This movement of the separate units is likely to generate force in the thrust direction (i.e., the Y direction) to deform the separate unit.

The separate units in the drawing are the sheet feed drive unit 230 and a waste toner drive unit 240. The sheet feed drive unit 230 transmits the driving force to the sheet feed unit that is driven by the drive motor 63. The waste toner drive unit 240 transmits the driving force to the waste toner driving mechanism driven by the drive motor 63. The sheet feed drive unit 230 is provided with a metal mounting plate 231 and the waste toner drive unit 240 is provided with a metal mounting plate 241.

Figure 10A:
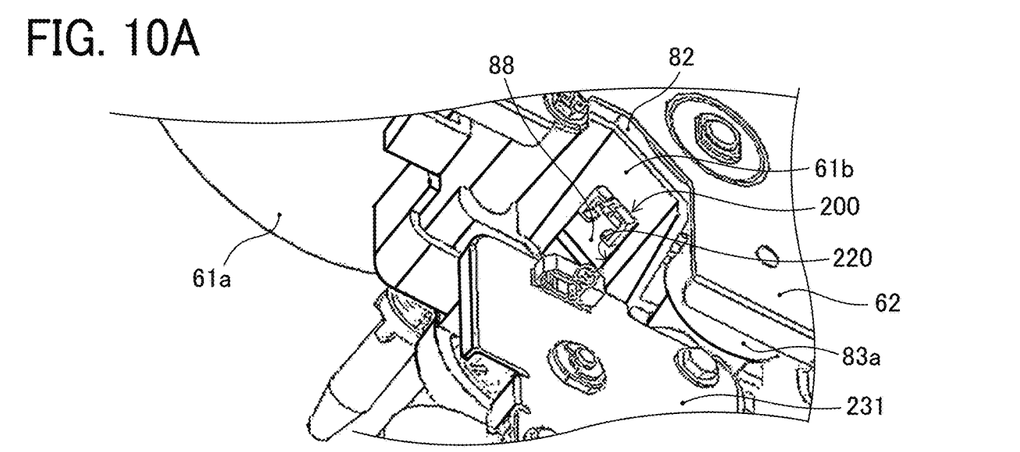
FIGS. 10A, 10B, and 10C are perspective views of an area near a locked opening.
Figure 10B:
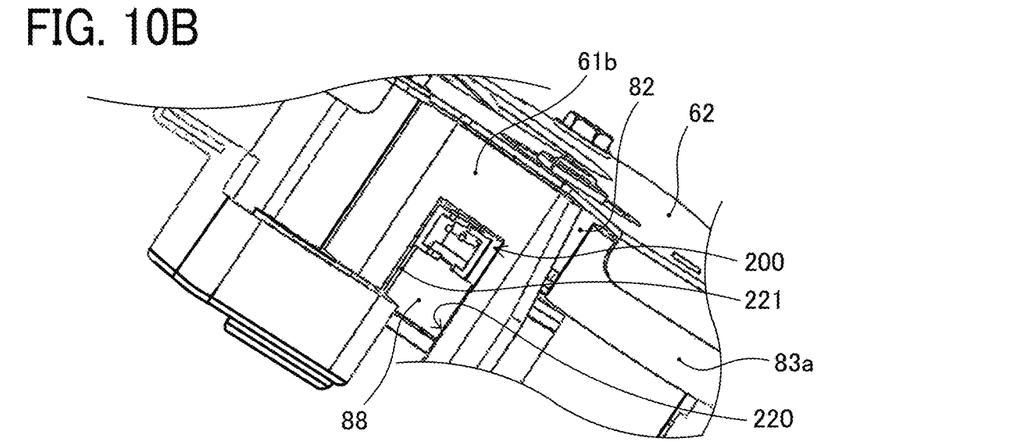
Figure 10C:
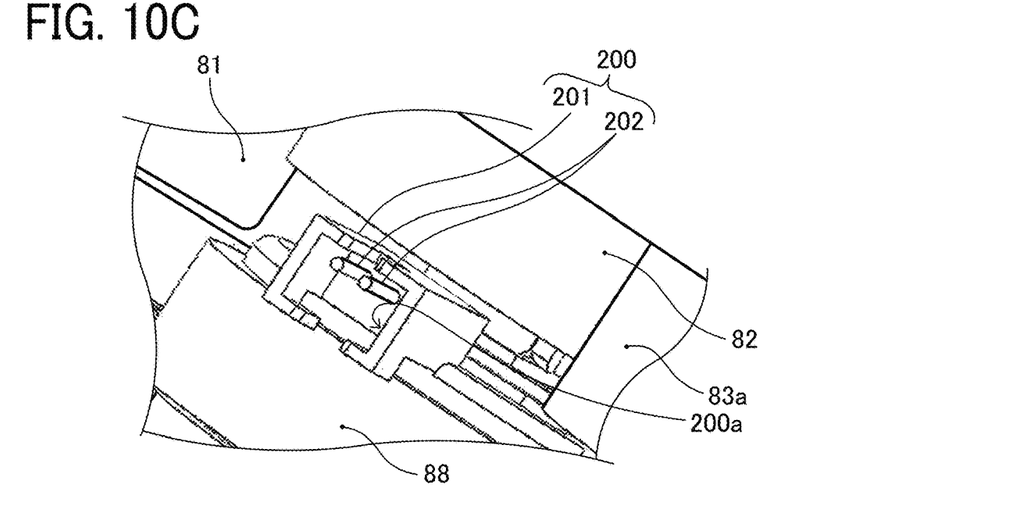

FIGS. 0A, 10B, and 10C are perspective views of an area near the rotation lock opening 220.

Specifically, FIG. 10A is an enlarged view of the area near the rotation lock opening 220 of FIG. 9.

FIG. 10B is another enlarged view of the area near the rotation lock opening 220 as viewed from another angle.

FIG. 10C is yet another enlarged view of the rotation lock opening 220 in a state where the gear housing portion 61*b* is removed.

Figure 11:
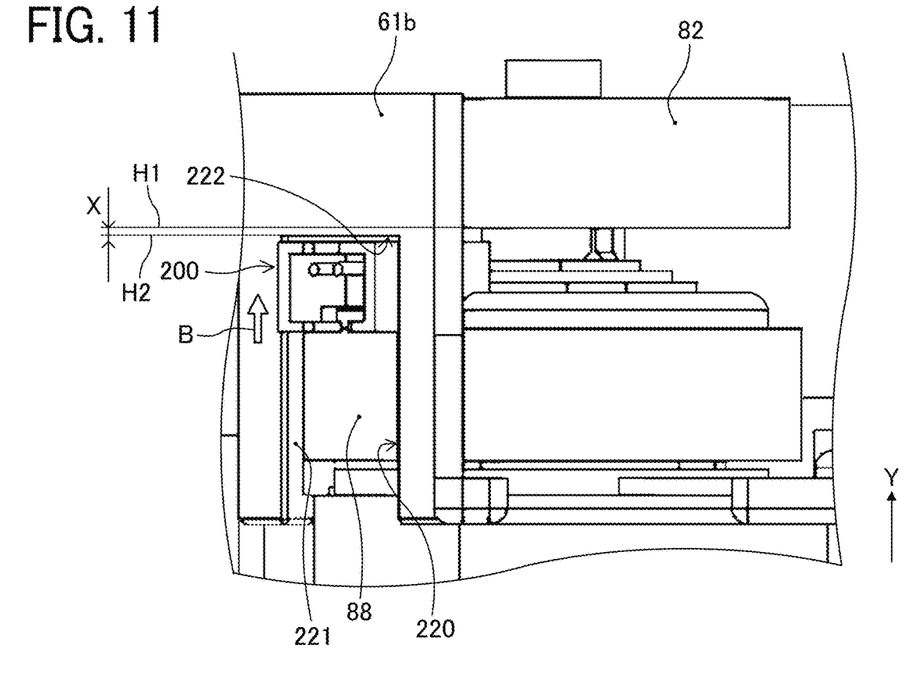
FIG. 11 is a diagram illustrating a thrust regulation portion formed in the rotation locked opening.

FIG. 11 is a diagram illustrating a thrust regulation portion formed in the rotation lock opening 220.

The connector 200 has an opening 200*a* to which the mating connector is removably insertable to the connector 200 in a radial direction of the shaft core 82*a* serving as a shaft.

An opening side face 221 in the rotation axis direction of the rotation lock opening 220 functions as a rotation lock. An end face 222 of the connector 200 in the rotation lock opening 220 on the side of the branch gear 82 functions as a thrust regulation portion. In other words, the end face 222 serves as a slide restriction portion. When the gear housing portion 61*b* is fixed to the metal mounting plate 62 and the branch gear 82, the development electromagnetic clutch 88, and the development first gear 89 are positioned in the thrust direction in the drive device 60, a position H2 of the end face 222 on which thrust regulation is performed is closer to the development electromagnetic clutch 88 than a position H1 of the end face of the tooth surface of the branch gear 82 on the side of the connector 200 is closer to the development electromagnetic clutch 88.

A description is given of the positioning of the branch gear 82, the development electromagnetic clutch 88, and the development first gear 89 in the thrust direction in the drive device 60.

In FIG. 8, the position of the branch gear 82 is adjustable on the shaft core 82*a* by a positional adjuster disposed above the branch gear 82. The shaft core 82*a* of the branch gear 82 has a D-shaped cross section on the lower side in FIG. 8, and the upper boss portion of the development electromagnetic clutch 88 is brought into contact with the upper end face of the D-shaped cutout of the shaft core 82*a*. The upper boss portion of the branch gear 82 is brought into contact with the bearing that is fixed to the metal mounting plate 62 and the lower boss portion of the branch gear 82 is brought into contact with the upper boss portion of the development electromagnetic clutch 88. Similar to the positioning of the branch gear 82 and the development electromagnetic clutch 88 described above, the lower boss portion of the development electromagnetic clutch 88 and the upper boss portion of the development first gear 89 are also brought into contact with each other. For the lower part of the development first gear 89, the lower boss portion of the development first gear 89 is brought into the bearing that is fixed to the wall of the gear housing portion 61*b*. As described above, the thrust position is determined.

The position H1 of the end face is set at a position at which the clearance X is obtained on stacking. The clearance X on the stacking is greater than 0. In other words, the position of the connector 200 in the thrust direction is restricted to a position at which a gap can be obtained with respect to the end face of the branch gear 82. As a result, even if the connector 200 is deformed in the thrust direction (i.e., the Y direction) so as to approach the branch gear 82 as indicated by the white arrow B when the mating connector is inserted or removed, the deformed connector 200 contacts the end face 222 of the rotation lock opening 220 of the housing so that the thrust regulation is performed. By so doing, the contact with the branch gear 82 can be prevented.

Figure 12:
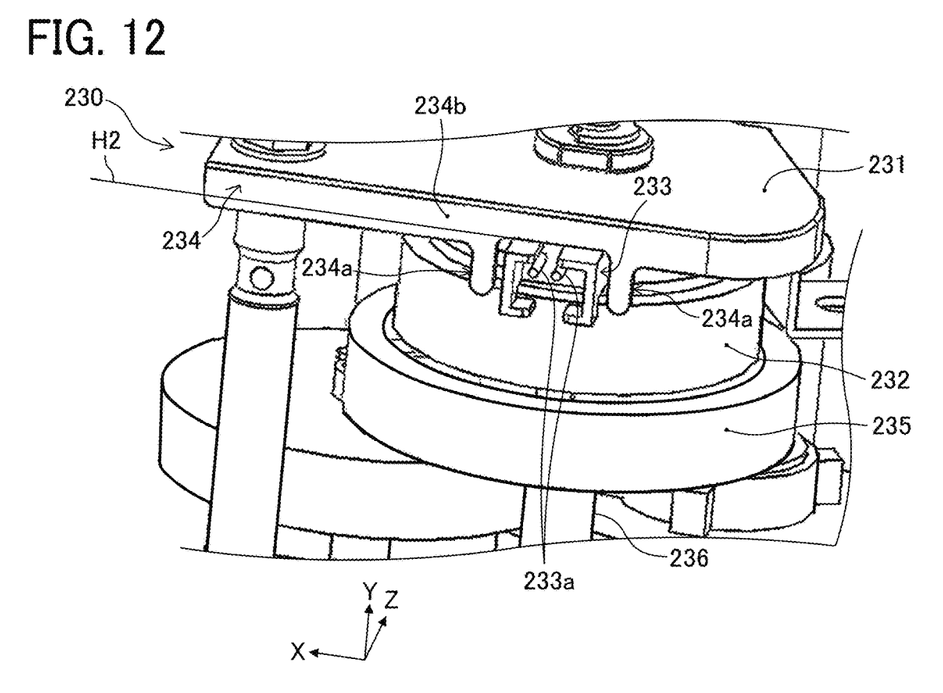
FIG. 12 is a perspective view of thrust regulation of an electromagnetic clutch, according to a modification of the present disclosure.

FIG. 12 is a perspective view of thrust regulation of a sheet feed electromagnetic clutch 232 that is a connector-integrated electromagnetic clutch provided in the sheet feed driving unit 230, according to a modification of the present disclosure.

In this configuration illustrated in FIG. 12, the thrust regulation is performed with the metal mounting plate 231. The sheet feed electromagnetic clutch 232 is held by a metal plate, and an extension portion pair 234a in the thrust direction (i.e., the −Y direction) is formed on the rotation lock curved portion 234. The extension portion pair 234a serves as a rotation lock. A connector 233 having pins 233a between the extension portion pair 234a is positioned. The extension portion pair 234a has a bent portion end face 234b. The part of the bent portion end face 234b between the extension portion pair 234a serves as a thrust regulation portion.

When the adjacent gear adjacent to the connector 233 is disposed above the sheet feed electromagnetic clutch 232 (i.e., in the Y direction) in FIG. 12, the electromagnetic clutch is sandwiched as in the configuration illustrated in FIG. 11. Due to such a configuration, the position H1 of the end face of the tooth surface of the adjacent gear and the position H2 of the bent portion end face 234b are arranged to be similar to the relative positions of the configuration illustrated in FIG. 11. By so doing, the connector 233 can be prevented from coming into contact with the adjacent gear.

If the electromagnetic clutch is in the sandwiched state in the configuration illustrated in FIG. 12, similar to the configuration illustrated in FIG. 11, the upper gear and the sheet feed electromagnetic clutch 232 are coupled to each other to transmit the driving force of the upper gear in FIG. 12 to a lower gear 235, so as to rotate a shaft 236. Alternatively, if the electromagnetic clutch is not in the sandwiched state in the configuration illustrated in FIG. 12, the lower gear 235 is rotated due to the driving force of the drive motor 63 to couple the upper gear and the sheet feed electromagnetic clutch 232 to transmit the driving force to the shaft 236 to be rotated. In this case, this configuration can prevent not a contact with a gear caused by a deformation of the connector 233 when inserting or removing a member but a shutdown (disconnection) of electrical connection of the pins 233a caused by an excessive deformation of the connector 233.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The effects described in the embodiments of this disclosure are listed as most preferable effects derived from the present disclosure, and therefore are not intended to limit to the embodiments of the present disclosure.

The above-described embodiments are limited examples, and the present disclosure includes, for example, the following aspects having advantageous effects. In the description of the aspects, reference numerals in parentheses after constituent names are examples of corresponding members, and the members are not limited to the examples.

Aspect 1

In Aspect 1, a drive transmitter (for example, the drive device 60, the sheet feed drive unit 230) includes a connector (for example, the connector 200, the connector 233), an electromagnetic clutch (for example, the development electromagnetic clutch 88, the registration electromagnetic clutch 85) including the connector as a single unit, a shaft (for example, the shaft core 82a, the shaft 236) having the electromagnetic clutch, and a restriction member (for example, the end face 222, the bent portion end face 234b) to restrict a position of the connector in an axial direction of the shaft.

According to this configuration, the position of the connector in the axial direction is restricted when the connector is deformed, so as to prevent the connector from coming into contact with and damaging a drive transmission member disposed close to the electromagnetic clutch.

Aspect 2

In Aspect 2, in the drive transmitter according to Aspect 1, the shaft (for example, the shaft core 82a, the shaft 236) includes a drive transmission member (for example, the branch gear 82) facing the connector (for example, the connector 200, the connector 233) in the axial direction of the shaft, and the restriction member (for example, the end face 222) restricts the position of the connector facing the drive transmission member.

According to this configuration, the drive transmission member can be prevented from being damaged due to deformation of the connector. In addition, this prevention of contact of such a deformed connector with the drive transmission member (for example, gears including the branch gear 82) can increase the width of the drive transmission member in the axial direction (for example, the tooth width of the gear teeth) and reduces the size of the drive transmitter in the thrust direction.

Aspect 3

In Aspect 3, in the drive transmitter according to Aspect 2, the shaft (for example, the shaft core 82a, the shaft 236) includes another drive transmission member (for example, the development first gear 89) on an opposite side of the drive transmission member across the electromagnetic clutch (for example, the development electromagnetic clutch 88).

According to this configuration, even when the electromagnetic clutch is used in a sandwiched state, the width of the drive transmission member in the axial direction (for example, the tooth width of the gear teeth) can be increased and the size of the drive transmitter in the thrust direction can be reduced.

Aspect 4

In Aspect 4, in the drive transmitter according to Aspect 1, the shaft (for example, the shaft core 82a, the shaft 236) includes a drive train including multiple drive transmission members (for example, the branch gear 82), and the electromagnetic clutch (for example, the development electromagnetic clutch 88) is disposed between adjacent drive transmission members among the multiple drive transmission members.

Aspect 5

In Aspect 5, the drive transmitter according to any one of Aspects 1 to 4 further includes a rotation lock (for example, the metal mounting plate 231, the gear housing portion 61b) on the restriction member (for example, the end face 222, the bent portion end face 234*b*) to stop a rotation of the electromagnetic clutch (for example, the development electromagnetic clutch 88).

According to this configuration, the restriction member can be formed with a simple structure in which the shape of the rotation lock that is typically disposed near the connector is changed.

Aspect 6

In Aspect 6, in the drive transmitter according to any one of Aspects 1 to 5, a mating connector relative to the connector (for example, the connector 200, the connector 233) is inserted into or removed from the connector in a radial direction of the shaft (for example, the shaft core 82*a*, the shaft 236).

Aspect 7

In Aspect 7, the drive transmitter according to any one of Aspects 1 to 6 further includes a housing (for example, the gear housing portion 61*b*) made of resin. The restriction member (for example, the end face 222, the bent portion end face 234*b*) is attached to the housing.

Aspect 8

In Aspect 8, the drive transmitter according to any one of Aspects 1 to 6 further includes a support (for example, the metal mounting plate 231) made of a metal plate of the drive transmitter. The restriction member (for example, the end face 222, the bent portion end face 234*b*) is attached to the support.

Aspect 9

In Aspect 9, a drive device (for example, the drive device 60) includes a drive source (for example, the drive motor 63) and the drive transmitter (for example, the drive device 60, the sheet feed drive unit 230) according to any one of Aspects 1 to 8.

According to this configuration, the drive device can achieve the effects described in Aspects 1 to 8.

Aspect 10

In Aspect 10, an image forming apparatus (for example, the printer 300) includes the drive device (for example, the drive device 60) according to Aspect 9.

According to this configuration, the image forming apparatus can achieve the effects described in Aspects 1 to 8.

Aspect 11

In Aspect 11, a drive transmitter (for example, the drive device 60, the sheet feed drive unit 230) includes a connector (for example, the connector 200, the connector 233), an electromagnetic clutch (for example, the development electromagnetic clutch 88, the registration electromagnetic clutch 85) including the connector as a single unit, a shaft (for example, the shaft core 82*a*, the shaft 236) as a rotation axis of the electromagnetic clutch, and a restriction member (for example, the end face 222, the bent portion end face 234*b*) to restrict a position of the connector in an axial direction of the shaft.

Aspect 12

In Aspect 12, the drive transmitter according to Aspect 1 further includes a drive transmission member (for example, the branch gear 82) coaxial with the electromagnetic clutch (for example, the development electromagnetic clutch 88, the registration electromagnetic clutch 85) and facing the connector in the axial direction, and the restriction member (for example, the end face 222) restricts a movement of the connector toward the drive transmission member.

Aspect 13

In Aspect 13, the drive transmitter according to Aspect 12 further includes another drive transmission member (for example, the development first gear 89) coaxial with the electromagnetic clutch (for example, the development electromagnetic clutch 88, the registration electromagnetic clutch 85). Said another drive transmission member is on an opposite side of the drive transmission member across the electromagnetic clutch (for example, the development electromagnetic clutch 88) in the axial direction.

Aspect 14

In Aspect 14, the drive transmitter according to Aspect 11 further includes multiple drive transmission members (for example, the branch gear 82, the development first gear 89) coaxial with the electromagnetic clutch (for example, the development electromagnetic clutch 88, the registration electromagnetic clutch 85). The electromagnetic clutch is between one of the multiple drive transmission members and another of the multiple drive transmission members in the axial direction.

Aspect 15

In Aspect 15, in the drive transmitter according to any one of Aspects 11 to 14, the restriction member (for example, the end face 222, the bent portion end face 234*b*) includes a rotation lock (for example, the gear housing portion 61*b*, the metal mounting plate 231) to lock a rotational movement of the electromagnetic clutch (for example, the development electromagnetic clutch 88, the registration electromagnetic clutch 85) around the shaft (for example, the shaft core 82*a*, the shaft 236).

Aspect 16

In Aspect 16, in the drive transmitter according to any one of Aspects 11 to 15, the connector (for example, the connector 200, the connector 233) has an opening (for example, the opening 200*a*) to which another connector (for example, the mating connector) is removably insertable to the connector in a radial direction of the shaft (for example, the shaft core 82*a*, the shaft 236).

Aspect 17

In Aspect 17, the drive transmitter according to any one of Aspects 11 to 16 further includes a housing (for example, the gear housing portion 61*b*) made of resin. The housing includes the restriction member (for example, the end face 222, the bent portion end face 234*b*).

Aspect 18

In Aspect 18, the drive transmitter according to any one of Aspects 11 to 16 further includes a support (for example, the metal mounting plate 231) made of a metal plate. The support includes the restriction member (for example, the end face 222, the bent portion end face 234*b*).

Aspect 19

In Aspect 19, in the drive transmitter according to any one of Aspect 11 to 18, the restriction member (for example, the end face 222, the bent portion end face 234*b*) has two opposing side faces (for example, the opening side face 221) sandwiching the connector (for example, the connector 200) in a rotational direction of the shaft to restrict a rotational movement of the connector around the shaft (for example, the shaft core 82*a*), and an end face (for example, the end face 222) orthogonal to the two opposing side faces to restrict an axial movement of the connector in the axial direction of the shaft.

Aspect 20

In Aspect 20, a drive device (for example, the drive device 60) includes the drive transmitter (for example, the drive device 60, the sheet feed drive unit 230) according to any one of Aspects 1 to 8, and a drive source (for example, the drive motor 63) to generate a power to be transmitted to the drive transmitter.

Aspect 21 In Aspect 21, an image forming apparatus (for example, the printer 300) includes the drive device (for example, the drive device 60) according to Aspect 20, and an image forming unit (for example, the image forming unit 150) driven by the drive device.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A drive transmitter comprising:
a connector;
an electromagnetic clutch including the connector as a single unit;
a shaft as a rotation axis of the electromagnetic clutch, the rotational axis extending in an axial direction;
a gear coaxial with the electromagnetic clutch, the gear facing the connector in the axial direction; and
a single restrictor to restrict a position of the connector in the axial direction which is toward the gear, and to restrict the connector from rotating around the rotation axis.

2. The drive transmitter according to claim 1, further comprising:
another gear coaxial with the electromagnetic clutch, wherein said another gear is on an opposite side of the gear across the electromagnetic clutch in the axial direction.

3. The drive transmitter according to claim 1, further comprising:
multiple gear coaxial with the electromagnetic clutch, wherein the electromagnetic clutch is between one of the multiple gear and another of the multiple gear in the axial direction.

4. The drive transmitter according to claim 1, wherein the single restrictor includes:
a rotation lock to lock a rotational movement of the electromagnetic clutch around the shaft.

5. The drive transmitter according to claim 1, wherein;
the connector has an opening to which another connector is removably insertable to the connector in a radial direction of the shaft.

6. The drive transmitter according to claim 1, further comprising:
a housing made of resin, the housing including the single restrictor.

7. The drive transmitter according to claim 1, further comprising:
a support including a metal plate, the support contacting the single restrictor.

8. The drive transmitter according to claim 1, wherein the single restrictor has includes:
two opposing side faces sandwiching the connector in a rotational direction of the shaft to restrict the connector from rotating around the rotation axis; and
an end face orthogonal to the two opposing side faces to restrict an axial movement of the connector in the axial direction.

9. A drive device comprising:
the drive transmitter according to claim 1; and
a drive source to generate a power to be transmitted to the drive transmitter.

10. An image forming apparatus comprising:
the drive device according to claim 9; and
an image forming unit driven by the drive device.

11. The drive transmitter according to claim 1, wherein:
an end face of the restrictor which restricts the position of the connector in the axial direction is outside a periphery of the gear.

12. The drive transmitter according to claim 1, wherein:
the single restrictor is unitary.

13. The drive transmitter according to claim 12, wherein:
the single restrictor includes resin.

* * * * *